Patented Oct. 23, 1951

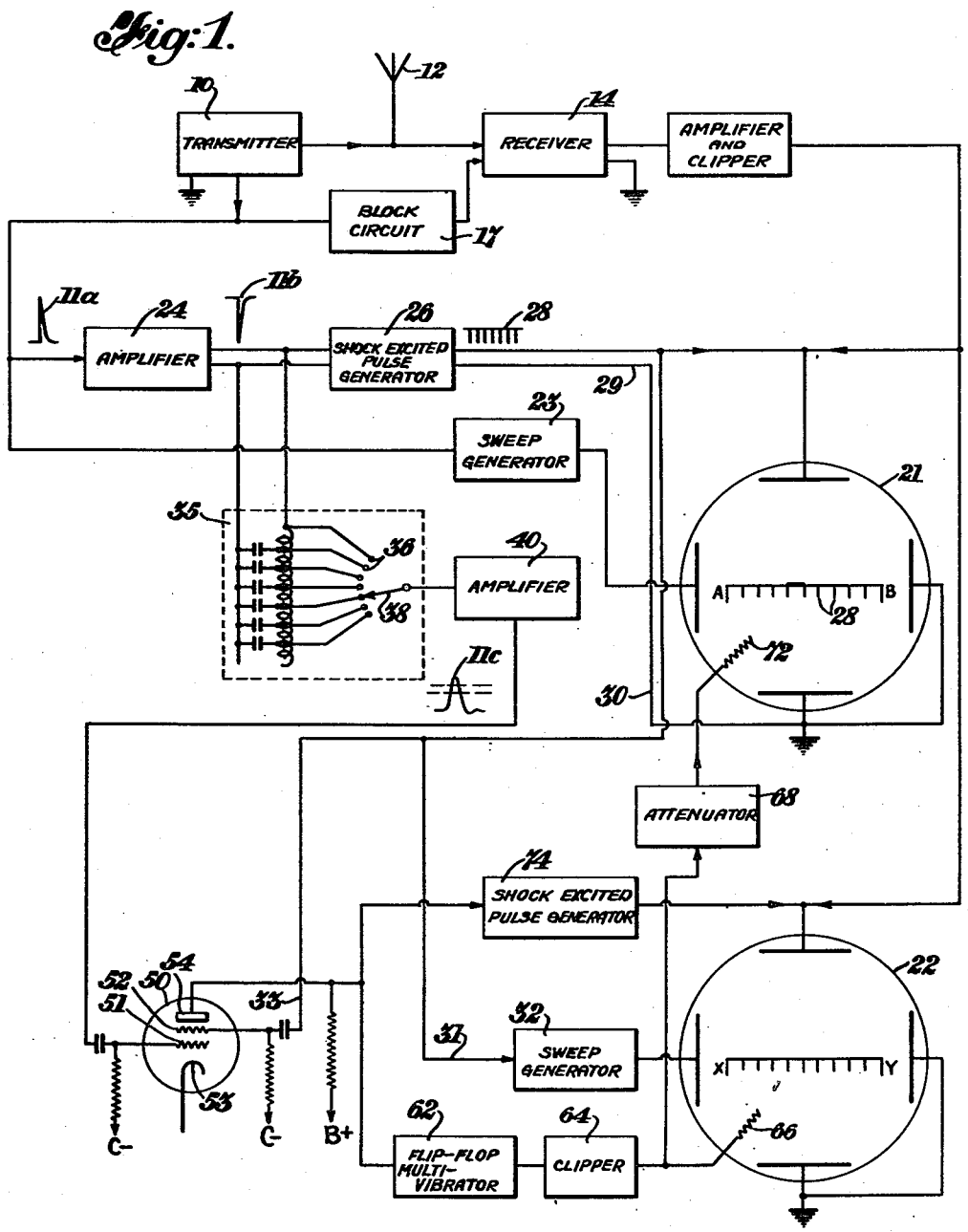

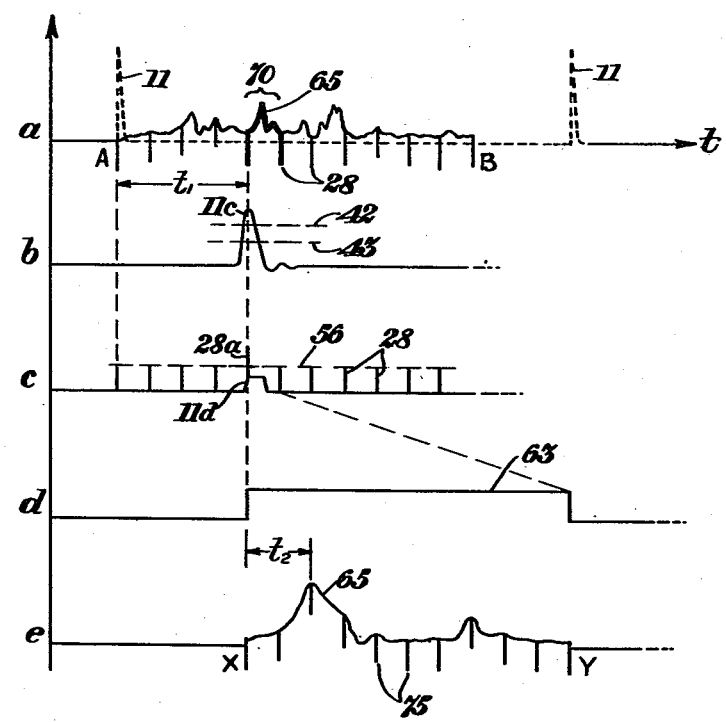

2,572,014

UNITED STATES PATENT OFFICE 2,572,014

RADIO-ECHO DISTANCE INDICATOR INCLUDING VERNIER MEANS

Louis A. de Rosa, Bloomfield, N. J., assignor to Federal Telephone and Radio Corporation, Newark, N. J., a corporation of Delaware Continuation of application Serial No. 474,145, January 30, 1943. This application July 8, 1947, Serial No. 759,660

15 Claims. (Cl. 343—13)

This invention relates to radio detection systems such as used for detecting and determining the distance to hostile aircraft and ships.

This application is a continuation of, and a substitute for, my copending application Serial No. 474,145, filed January 30, 1943, now abandoned.

In my copending application Serial No. 464,008, filed October 31, 1942, I show several embodiments of radio detection systems in which I use first and second oscillographs, the first oscillograph to obtain an approximate indication or panoramic view of the location of obstacles within a given range such as 200 miles more or less, and the second oscillograph to provide for a more accurate or vernier indication of the distance to a selected one of the obstacles detected by the first oscillograph.

It is an object of this invention to provide a method and means in addition to the methods and means disclosed in my aforesaid copending application Serial No. 464,008 for determining with a high degree of accuracy the distance to detected obstacles.

Another object of my invention is to provide a method and means to produce a narrow pulse selectively displaced with respect to a synchronizing or main pulse.

According to features of my invention, the selective displacement of the narrow pulse relative to a synchronizing or main pulse is accomplished by first generating a series of narrow pulses having a given displacement between successive pulses, in timed relation with respect to the synchronizing pulse. Energy of the synchronizing pulse is retarded an amount equal to a selected displacement and then is mixed with the series of narrow pulses and serves to segregate one of the series. The output of the mixing operation is so controlled as to produce an output or reference pulse similar in shape to the narrow pulses whenever one of the narrow pulses coincides with the retarded pulse energy. This reference pulse has the selected displacement determined by the retardation of the synchronizing pulse, and since it is of narrow duration, it defines more accurately the amount of retardation than the retarded pulse energy which is rounded off by the retarding action.

This method of pulse production may be used for determining the distance to an obstacle indicated on the screens of cathode ray oscillographs. For example, the synchronizing pulse is synchronized with the transmission of impulses the reflections of which, caused by obstacles, produce echo pulses that appear upon the screens of the oscillographs. The series of narrow pulses produced may be applied to the first or panoramic viewing oscillograph as marker pulses, and to the second or vernier oscillograph to control the production of sweep potentials therefor. Thus, the second or vernier oscillograph is provided with a sweep corresponding to a designated segment of the sweep of the first oscillograph. To determine what part or segment of the panoramic sweep that is desirable to be covered by the vernier sweep, the reference pulses produced by the mixing operation may be used to control a flip-flop type of multi-vibrator to produce a pulse of a duration equal to the time interval determined by the marker pulses on the first oscillograph. This extended pulse is then applied to the grids controlling the intensity of the beams for the two oscillographs so that the portion of the sweep of the first oscillograph corresponding to the perceptible sweep of the second oscillograph is designated by an added brilliance. In addition, a second series of pulses may be produced in timed relation with the reference pulse for calibration of the sweep of the second oscillograph. The time between transmission of an impulse and the initiation of the perceptible sweep for the second oscillograph will be determined by the amount of retardation applied to the synchronizing pulse.

It will be clear, therefore, that long periods of time can be precisely measured by using a retardation means in accordance with my invention, even though the retardation of the synchronizing pulse tends to distort and round out the pulse.

For a further understanding of the invention, reference may be had to the following detailed description to be read in connection with the accompanying drawings, in which:

Fig. 1 is a schematic illustration of a radio detection system in accordance with my invention, and Fig. 2 is a graphical illustration of the operating features of the invention.

Referring to Figs. 1 and 2, the radio detection system illustrated includes a transmitter 10 by which impulses 11 (curve a) are transmitted over an antenna 12. A receiver 14 together with a first oscillograph 21 and a second oscillograph 22 receive and indicate echo pulses produced by obstacles in response to the transmitted impulses 11. The receiver 14 is blocked by the usual blocking circuit 17 controlled by synchronizing pulses 11a from the transmitter 10 so as to protect the receiver during transmission of the impulses, The first oscillograph 21 is adapted to indicate approximately the location of the reflecting obstacles while the second oscillograph provides an expanded view of a portion of the time base of the oscillograph 21, so that vernier measurement of the distance to a particular obstacle can be made. The sweep wave of the first oscillograph is generated by a sweep generator 23 in response to the synchronizing pulses 11a, which are timed with the transmission of the impulses 11. The sweep X—Y of the second oscillograph is also based on the occurrence of the synchronizing pulses 11a, but may be varied to provide for perceptibility of selected portions of the range covered by the sweep A—B of the first oscillograph.

For generation and control of the sweep X—Y, each synchronizing pulse 11a is amplified by an amplifier 24. This produces a negative pulse 11b which I use to control a pulse generator 26, such as the shock-excited pulse generator disclosed in my copending applications Serial Nos. 466,557 and 467,341, filed November 23 and 30, 1942, now Patent No. 2,438,904, granted April 6, 1948, and Patent No. 2,495,704, granted January 31, 1950, respectively. The generation of pulses by either of the embodiments disclosed in these applications involves the shock excitation of a resonant circuit, whereby a damped oscillation is produced. Means are provided to compensate for the decay of the oscillations so as to produce substantially constant amplitude oscillations in respect to the synchronizing pulse. These oscillations are clipped and differentiated to produce pulses 28 which are narrow in duration, and applicable as marker pulses for calibration purposes as indicated in connection with the deflection circuit of the first oscillograph 21. I also use pulses 28 by connection 30 and 31 to control the sweep generator 32 of the second oscillograph 22. This provides a sweep X—Y for the oscillograph 22 in response to each of the pulses 28.

In order to produce the adjustment of the perceptibility of the sweep X—Y, the pulse 11b is applied to a delay line 35. This delay line may be of the type having a network of condensers and inductances arranged with outlet taps 36 so as to provide for selected retardation. The delay line is provided with an adjustable contact 38 adapted for selected engagement with the outlet taps 36. An amplifier 40 is connected to the adjustable contact 38 for amplification and clipping of the retarded pulse energy 11c as indicated between clipping levels 42 and 43 (curve b). This is desirable where the pulse is rounded because of the filtered action of the delay network. The delay line for any appreciable retardation tends to round off the pulse so that the leading edge thereof is no longer substantially vertical. By amplifying and clipping the retarded pulse, a substantially rectangular pulse shape 11d (curve c) is produced. This rectangular pulse 11d is applied to a grid 51 of a vacuum tube 50.

The pulses 28 of the generator 26 are also applied through connections 30 and 33 to a second grid 52 of the vacuum tube 50. The grids 51 and 52 are suitably biased negatively so that the pulses received independently on the grids 51 and 52 are insufficient to produce conduction between the cathode 53 and the anode 54. This is illustrated by the gate level of the tube indicated by broken line 56 in curve c. When the retardation of the pulse 11d is such that one of the pulses 28 coincides therewith, the resulting momentary conduction of the tube produces a reference pulse 28a, which is similar in shape to the pulse 28. As the retardation of the pulse energy 11c is varied by adjustment of the contact 38, the rectangular pulse 11d will combine with successive pulses 28 to thereby vary the occurrence of the reference pulse 28a in steps according to the displacement of the pulses 28.

The reference pulse 28a is applied to a known flip-flop multi-vibrator 62 of the character adapted to flip from a first state of operation to a second in response to a pulse 28a and then to flop back to the first state of operation after a predetermined interval adjustable to approximately the time displacement of the pulses 28. This produces an extended rectangular pulse 63. To insure substantial constant amplitude for the pulse 63, the output of the multi-vibrator 62 is applied through a clipper stage 64. The pulse 63 is applied to an electrode 66 which controls the intensity of the beam of the oscillograph 22. Thus, for the duration of the pulse 63, the beam will be increased in intensity so as to produce a perceptible sweep X—Y for the duration of the pulse 63. Since the pulse 63 is in synchronism with the reference pulse 28a, the initiation of the sweep X—Y will be determined precisely by the adjustment of the contact 38 of the delay line 35.

In order to indicate the portion 70 of the sweep A—B of the first oscillograph 21, which is covered by the sweep X—Y, the pulse 63 is applied through an attenuator 68 to an electrode 72 of the oscillograph 21 whereby the beam of the oscillograph 21 is increased in intensity for the duration of the pulse 63. Since the sweep X—Y is selected for purposes of illustration ten times faster than the sweep A—B, this indication 70 will be 1/10 of the sweep A—B.

The reference pulses 28a are also applied to a shock excited pulse generator 74 similar to generator 26 to produce calibration pulses 75 for the sweep X—Y.

From an inspection of Fig. 2, the operation of the system is readily apparent. Curve a shows the panoramic sweep A—B of oscillograph 21 deflected in accordance with reflections received in response to transmission of impulses 11. The sweep is also shown calibrated with marker pulses 28. Curve b represents the resulting shape of synchronizing pulse 11b after it has passed through a portion of the delay line 35. After this retarded pulse 11c is amplified and clipped a substantially rectangular pulse 11d, curve c is produced. The pulse 11d is mixed in tube 50 with pulses 28 and when a pulse 28 coincides with the pulse 11d conduction by the tube occurs, thereby producing the reference pulse 28a similar in shape to the narrow pulses 28. This reference pulse represents the setting of the contact 38 on the delay line 35. The sweep X—Y (curve e) is timed according to the pulses 28 and the perceptibility thereof is controlled by the multi-vibrator pulse 63 (curve d), which is synchronized with the reference pulse 28a. The pulse 63 also increases the brilliance of the portion 70 of the sweep A—B, which corresponds to the perceptible sweep X—Y on the oscillograph 22. Thus, the perceptible sweep X—Y of the oscillograph 22 covers in expanded scale the portion of the range indicated by 70 on the sweep A—B of oscillograph 21. By detection of the occurrence of echo pulses such as the pulse 65, for example, among the calibration pulses 75, the vernier measurement of the distance to an obstacle causing the echo pulse 65 is obtained.

While I have disclosed a specific apparatus for producing the panoramic viewing and the vernier measurement of distance to obstacles in accordance with my invention, it will be understood that the form herein illustrated and described is given by way of example only and not as limiting the object of the invention and the appended claims.

I claim:

1. A method of producing a narrow pulse selectively displaced relative to a synchronizing pulse comprising generating in response to each synchronizing pulse a series of narrow pulses having a given displacement therebetween in timed relation with said synchronizing pulse, deriving a portion of energy from said synchronizing pulse, delaying said derived portion of energy to occur at a desired later time point and segregating by means of said pulse portion a given one of said series of pulses to produce an output pulse similar to said narrow pulses each time one of the narrow pulses coincides with said pulse portion.

2. The method defined in claim 1 wherein the production of the output pulse from the segregating operation comprises limiting the effect of the segregated energy to an amplitude at least as great as the derived pulse energy whereby output energy is produced only by superposition of a narrow pulse on the derived pulse energy.

3. The method defined in claim 1 in combination with the steps of amplifying and clipping the energy of said synchronizing pulse whereby the pulse energy is translated into a substantially rectangular pulse shape before it is used for segregating one of a series of narrow pulses.

4. In a method of determining the distance to an obstacle indicated on the screen of a cathode ray beam oscillograph by an echo pulse produced by the obstacle in response to a transmitted impulse the steps of generating a series of narrow pulses having a given displacement therebetween in timed relation with said impulse, selecting one of said series of pulses as a reference pulse in accordance with a given portion of the screen to be observed, sweeping the cathode ray beam of said oscillograph across said screen in synchronism with each of the pulses of said series, generating a pulse of a desired duration in response to said reference pulse, and applying the duration pulse to control the intensity of the beam of the oscillograph so as to render perceptible a selected portion of the sweep as determined by said duration pulse.

5. In a method of determining the distance to an obstacle indicated on the screens of first and second cathode ray beam oscillographs by an echo pulse produced by the obstacle in response to a transmitted impulse, the steps of generating a series of narrow pulses having a given displacement therebetween in timed relation with said impulse, selecting one of said series of pulses as a reference pulse in accordance with a given portion of the screen to be observed, producing a sweep potential for the beam of the first oscillograph in synchronism with the transmission of said impulse, producing sweep potentials for the beam of the second oscillograph in synchronism with each of the pulses of said series, generating a pulse of desired duration in response to said reference pulse, applying the duration pulse to render perceptible a selected portion of the sweep of the second oscillograph as determined by said duration pulse, and to render more brilliant the portion of the sweep of the first oscillograph corresponding to the perceptible sweep of the second oscillograph.

6. The method defined in claim 5 wherein the step of generating the duration pulse includes the step of translating said reference pulse into a substantially rectangular pulse of a duration approximately equal to the displacement between the successive pulses of said series.

7. A system for producing a narrow pulse selectively displaced relative to a synchronizing pulse comprising a source of synchronizing pulses, means to generate in response to each pulse from said source a series of narrow pulses having a given displacement therebetween in timed relation with a given synchronizing pulse of said source, means to retard energy of said synchronizing pulse a selected multiple of said displacement, a vacuum tube to mix the retarded pulse energy with said series of pulses, and means to bias the vacuum tube so as to produce an output pulse when one of said narrow pulses coincides with said retarded pulse.

8. A system for producing a narrow pulse selectively displaced relative to a synchronizing pulse comprising a source of synchronizing pulses, means to generate a series of narrow pulses having a given displacement therebetween in timed relation with a given synchronizing pulse of said source including a resonant circuit arranged to be shock excited by said synchronizing pulses, means to retard energy of said synchronizing pulse a selected multiple of said displacement, a vacuum tube to mix the retarded pulse energy with said series of pulses, and means to bias the vacuum tube so as to produce an output pulse when one of said narrow pulses coincides with said retarded pulse.

9. A system for producing a narrow pulse selectively displaced relative to a synchronizing pulse comprising a source of synchronizing pulses, means to generate a series of narrow pulses having a given displacement therebetween in timed relation with a given synchronizing pulse of said source, means to retard energy of said synchronizing pulse a selected multiple of said displacement, said means for retarding having associated therewith means to amplify and clip the retarded energy so as to produce a substantially rectangular pulse shape, a vacuum tube to mix the retarded pulse energy with said series of pulses, and means to bias the vacuum tube so as to produce an output pulse when one of said narrow pulses coincides with said retarded pulse.

10. In a radio detection system having a transmitter, a receiver and at least one oscillograph for detecting the reception of an echo pulse produced in response to a transmitted impulse, the combination therewith of means for generating a series of narrow pulses having a given displacement therebetween in timed relation with said impulse, means to retard pulse energy synchronized with said impulse a selected multiple of said displacement, a vacuum tube for mixing the retarded pulse energy with said series of pulses, means to bias said tube so as to produce a reference output when one of the series of pulses coincides with said retarded pulse energy, means responsive to each of the pulses of said series to produce a sweep potential for the oscillograph, means to generate a pulse of a desired duration in response to said reference pulse, said oscillograph having a beam intensity control circuit and means to apply the duration pulse to the beam intensity control circuit of the oscillograph so as to render perceptible a sweep thereof displaced with respect to said impulse an amount equal to the retardation of said pulse energy.

11. In a radio detection system having a transmitter, a receiver and first and second oscillographs for indicating an echo pulse produced by an obstacle in response to a transmitted impulse the combination therewith of means to generate a series of narrow pulses having a given displacement therebetween in timed relation with said impulse, means to retard pulse energy synchronized with said impulse a selected multiple of said displacement, a vacuum tube for mixing the retarded pulse energy with said series of pulses, means to bias said tube so as to produce a reference pulse output similar in shape to said narrow pulses each time one of said narrow pulses coincides with said retarded pulse energy, means to produce a sweep potential for the first oscillograph in synchronism with the transmission of the said impulse, means to produce a sweep potenial for the second oscillograph in synchronism with each of the pulses of said series, means to generate a pulse of a desired duration in response to said reference pulse, said first oscillograph and said second oscillograph each having a beam intensity control circuit, means to apply the duration pulse to the beam intensity control circuit of the second oscillograph so as to render perceptible a sweep thereof displaced with respect to said impulse an amount equal to the retardation of said pulse energy, and means to apply the duration pulse to the intensity control circuit of the first oscillograph so as to render more brilliant the portion of the sweep thereof corresponding to the range covered by the sweep of said second oscillograph.

12. A method of determining the distance to an obstacle indicated on the screens of first and second cathode ray beam oscillographs by an echo pulse produced by the obstacle in response to a transmitted impulse, comprising generating a series of narrow pulses having a given displacement therebetween in timed relation with said impulse, selecting one of said series of pulses as a reference pulse in accordance with a given portion of the screen to be observed, producing a sweep potential for the beam of the first oscillograph in synchronism with the transmission of said impulse, producing sweep potentials for the beam of the second oscillograph in synchronism with each reference pulse, generating a pulse of desired duration in response to said reference pulse, applying the duration pulse to render perceptible the sweep of the second oscillograph as determined by said duration pulse, and to render more brilliant the portion of the sweep of the first oscillograph corresponding to the perceptible sweep of the second oscillograph.

13. A system for producing a narrow pulse selectively displaced relative to a synchronizing pulse comprising a source of synchronizing pulses, means to generate a series of narrow pulses having a given displacement therebetween in timed relation with a given synchronizing pulse of said source, means to retard energy of said synchronizing pulse in a plurality of fixed steps each of a selected multiple of said displacement, a vacuum tube to mix the retarded pulse energy with said series of pulses, and means to bias the vacuum tube so as to produce an output pulse when one of said narrow pulses coincides with said retarded pulse.

14. In a radio detection system having a transmitter, a receiver and at least one oscillograph for detecting the reception of an echo pulse produced in response to a transmitted impulse, the combination therewith of means for generating a series of narrow pulses having a given displacement therebetween in timed relation with said impulse, means to retard pulse energy synchronized with said impulse a selected multiple of said displacement, a vacuum tube for mixing the retarded pulse energy with said series of pulses, means to bias said tube so as to produce a reference pulse output when one of the series of pulses coincides with said retarded pulse energy, means to produce a sweep potential for the oscillograph for each reference pulse, means to generate a pulse of a desired duration in response to said reference pulse, said oscillograph having a beam intensity control circuit and means to apply the duration pulse to the beam intensity control circuit of the oscillograph so as to render perceptible a sweep thereof displaced with respect to said impulse an amount equal to the retardation of said pulse energy.

15. In a radio detection system having a transmitter, a receiver and first and second oscillographs for indicating an echo pulse produced by an obstacle in response to a transmitted impulse the combination therewith of means to generate a series of narrow pulses having a given displacement therebetween in timed relation with said impulse, means to retard pulse energy synchronized with said impulse a selected multiple of said displacement, a vacuum tube for mixing the retarded pulse energy with said series of pulses, means to bias said tube so as to produce a reference pulse output similar in shape to said narrow pulses each time one of said narrow pulses coincides with said retarded pulse energy, means to generate a pulse of a desired duration in response to said reference pulse, said first oscillograph and said second oscillograph each having a beam intensity control circuit, means to apply the duration pulse to the beam intensity control circuit of the second oscillograph so as to render perceptible a sweep thereof displaced with respect to said impulse an amount equal to the retardation of said pulse energy, and means to apply the duration pulse to the intensity control circuit of the first oscillograph so as to render more brilliant the portion of the sweep thereof corresponding to the range covered by the sweep of said second oscillograph.

LOUIS A. DE ROSA.

REFERENCES CITED

The following references are of record in the file of this patent:

UNITED STATES PATENTS

| Number | Name | Date |
|---|---|---|
| 2,355,363 | Christaldi | Aug. 8, 1944 |
| 2,416,088 | Deerhake | Feb. 18, 1947 |
| 2,423,082 | Busignies | July 1, 1947 |

FOREIGN PATENTS

| Number | Country | Date |
|---|---|---|
| 552,072 | Great Britain | Apr. 15, 1943 |